United States Patent [19]
Dobberpuhl

[11] 3,931,745
[45] Jan. 13, 1976

[54] TENSIONING DEVICE FOR A FLEXIBLE DRIVE ELEMENT

[75] Inventor: Dale Rudolph Dobberpuhl, Horicon, Wis.

[73] Assignee: Deere & Company, Moline, Ill.

[22] Filed: Oct. 29, 1974

[21] Appl. No.: 518,586

[52] U.S. Cl. .......................................... 74/242.11 S
[51] Int. Cl.² ......................... F16H 7/12; F16H 7/10
[58] Field of Search... 74/242.8, 242.11 S, 242.14 R

[56] References Cited
UNITED STATES PATENTS

| | | | |
|---|---|---|---|
| 3,673,884 | 7/1972 | Southiere | 74/242.11 S |
| 3,811,332 | 5/1974 | Brown et al. | 74/242.11 S |
| 3,834,477 | 9/1974 | Sandow | 74/242.11 S X |

*Primary Examiner*—Leonard H. Gerin

[57] ABSTRACT

A drive chain trained about a drive and driven sprockets of different diameters is kept in proper tension by a tensioning device comprising a tensioning member located between the sprockets and extending transversely to the line of centers passing through the axes of rotation of the sprockets. The tensioning member is in the form of a rectangular block defining an opening through which the drive chain passes, opposite sides of the opening being bounded by inwardly facing abutment surfaces respectively engaging the opposite runs of the chain. The tensioning member is biased towards the larger of the sprockets and against the chain through means of a coil compression spring mounted on a guide rod which passes through an opening in the tensioning member and is pivotally mounted on and for swinging movement to the opposite sides of the line of centers of the sprockets at a location between the tensioning member and the smaller of the sprockets.

6 Claims, 3 Drawing Figures

U.S. Patent   Jan. 13, 1976   3,931,745
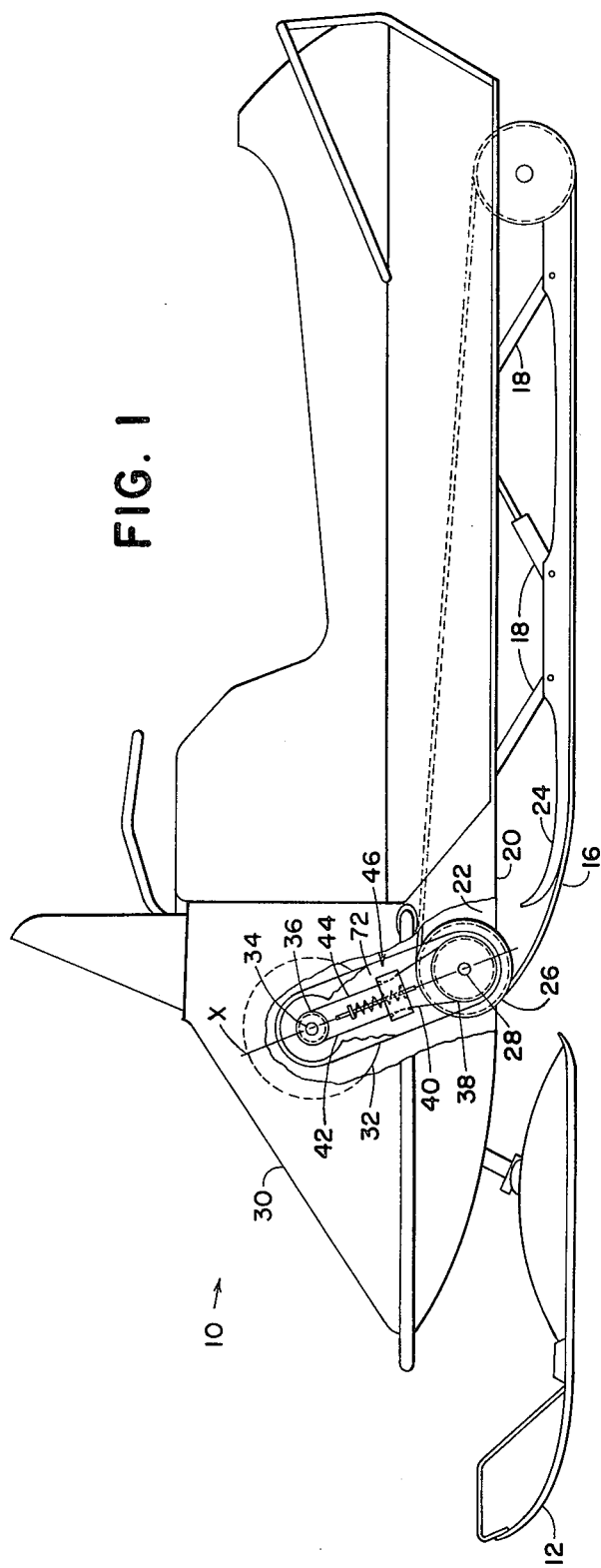
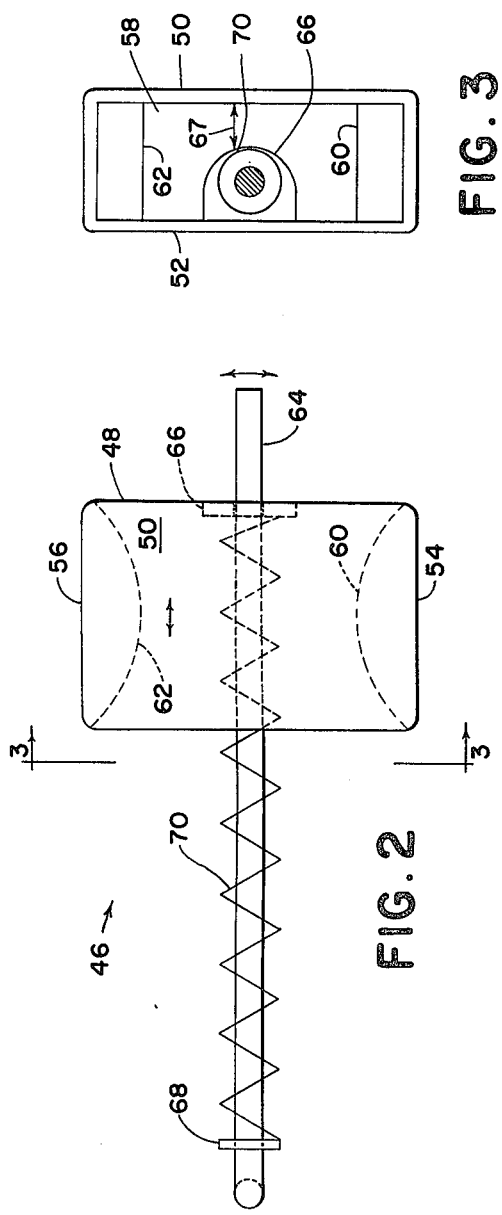

TENSIONING DEVICE FOR A FLEXIBLE DRIVE ELEMENT

BACKGROUND OF THE INVENTION

The present invention relates to a device for maintaining proper tension in flexible drive elements, such as chains or belts and the like, employed in machines or mechanisms of any kind for the purpose of transmitting a driving effort between drive and driven sprockets or pulleys and the like. More specifically, the present invention relates to a tensioning device which is particularly adapted for use with drives wherein the drive and driven members are of different diameters.

The present invention concerns a tensioning means intended for use with a flexible drive element in which each of the two runs or sides thereof is liable to be alternatively tensioned and relaxed, one run being tensioned and the other being slack during normal driving in one direction during acceleration, but said first-named run becoming slack and the other becoming tensioned in the event of overrun occurring in the mechanism or in the event of the drive being reversed.

Heretofore, it has been the practice in the art to provide tensioning means of the type described which either incorporated some sort of manually adjustable means, which required relatively frequent adjustment in order to compensate for wear in the drive components (see, for example, U.S. Pat. No. 3,060,760 granted to Minnis on 30 Oct. 1962), or incorporated a spring or other mechanical or hydraulic biasing means to maintain proper tension without manual adjustment (see, for example, U.S. Pat. No. 3,673,884 granted to Southiere on 4 July 1972). Of course, relatively frequent manual adjustment is bothersome and not desirable and a tensioning means incorporating biasing means are relatively complicated, somewhat unreliable due to spring failure and/or are relatively expensive.

SUMMARY OF THE INVENTION

According to the present invention, there is provided a novel tensioning device for maintaining the opposite runs of a flexible drive element trained about drive and driven members of different diameters in proper tension regardless of which run is tensioned and relaxed during operation of the machine or mechanism in which the drive element is embodied.

A broad object of the invention is to provide a tensioning device of reliable, relatively simple construction which requires no manual adjustment to compensate for wear endured by drive components.

Another object of the invention is to provide a tensioning device including a tensioning member which, when embodied in drive wherein the larger of the drive and driven members is substantially vertically above the other, has its weight completely supported by the opposite runs of a flexible drive element.

A further object of the invention is to provide a tensioning device including a tensioning member urged toward the larger of the drive and driven elements into engagement with the opposite runs of the flexible drive element by a single biasing means, the flexible drive element and the biasing means forming the sole support for the tensioning member.

Still a more specific object of the invention is to provide a tensioning member which has a generally rectangular box shape and includes an opening therethrough in which is received the flexible drive element, the opening being bounded at opposite sides by abutment surfaces which engage the opposite runs of the drive element.

These and other objects will become apparent from reading the ensuing description in conjunction with the appended drawings.

BRIEF DESCRIPTION OF THE DRAWINGS

FIG. 1 is a left side elevational view of a snowmobile having parts broken away to expose a schematically depicted drive embodying a tensioning device constructed according to the present invention.

FIG. 2 is a left side view of the tensioning member shown in FIG. 1, but with the member rotated clockwise from its FIG. 1 position.

FIG. 3 is a sectional view taken along line 3—3 of FIG. 2.

DESCRIPTION OF THE PREFERRED EMBODIMENT

While the present invention has a wide range of application, it is shown here embodied in a snowmobile designated in its entirety by the reference numeral 10. The snowmobile 10 is of a conventional type supported at its front end by a pair of skis 12 (only one shown) and at its middle and rear portions by a ground-engaging flexible track 16. The weight of the snowmobile is here shown supported on a slide rail suspension comprising a plurality of links 18 connected between left and right depending frame walls 20 and 22 and a pair of slide rails 24 (only one shown) engaging the inside of the track 16. The track 16 is driven in a conventional manner by one or more sprocket wheels 26 mounted on a transverse shaft 28 and engaged with the inside of the track 16.

An engine (not shown) disposed within a hood 30 is drivingly connected, through means of a conventional variable speed transmission shown partially at 32, to a transverse shaft 34 having a drive sprocket 36 mounted thereon for rotation therewith. Mounted on the transverse shaft 28 beside the track drive sprocket wheel 26 is a driven sprocket 38; and trained about the drive and driven sprockets 36 and 38 is a flexible drive element in the form of a chain 40 having opposite runs 42 and 44 respectively located forwardly and rearwardly of a line of centers X passing through the axes of rotation of the sprockets 36 and 38. Thus, it will be appreciated that torque developed by the engine will be transmitted to the track 16 via the transmission 32, shaft 34, drive sprocket 36, chain 40, driven sprocket 38, transverse shaft 28 and sprocket wheel 26. Due to normal wear of itself and other drive components, the chain 40 tends to slacken. The slack of the chain 40 is more or less evenly distributed in the opposite runs 42 and 44, as illustrated in FIG. 1, when the snowmobile 10 is at rest, but tends to be wholly present on one side or the other depending on the operation of the snowmobile drive. For example, when the drive is operated to accelerate the snowmobile in the forward direction, the chain 40 will be rotated counterclockwise and the run 44 thereof will thus be tensioned while the run 42 is slack. On the other hand, when the snowmobile is decelerating and the track 16 overruns the engine, the run 42 will be tensioned while the run 44 becomes slack.

To ensure that the slack of the chain 40 is always taken up such that the chain 40 is properly tensioned so as to prevent it from jumping off the sprockets 36 and 38, a tensioning device 46 is provided. The tensioning device 46 includes a one-piece tensioning member 48 which preferably is made of a wear-resistant, low-friction material such as an acetal resin or the like. One known material of the desired type is sold by DuPont under the trademark, Delrin. The tensioning member 48 has a generally rectangular box-like shape bounded by left and right sides 50 and 52, respectively, and front and rear sides 54 and 56, respectively, as view in FIG. 1. Extending centrally through the member 48 between the front and rear sides 54 and 56 is an opening 58 which is substantially rectangular in transverse cross section. The front and rear sides 54 and 56, respectively, of the member 48 define inwardly facing arcuate abutment surfaces 60 and 62, respectively, which border the front and rear sides of the opening 58. The front abutment surface 60 is engaged with the front run 42 of the chain 40 while the abutment surface 62 is similarly engaged with the run 44 of the chain 40. It is herenoted that the driven sprocket 38 is larger than the drive sprocket 36 and that the opening 58 is dimensioned such that the distance between the abutment surfaces 60 and 62 is considerably smaller than the diameter of the driven sprocket 38 so that the tensioning member 48 is supported entirely on the chain 40.

In drives such as that illustrated in FIG. 1, wherein drive and driven members of different diameters are located one substantially vertically above the other with the larger of the two below the other, the weight of the tensioning member 48 would normally be sufficient to keep it positioned on the flexible drive element so as to operate to effectively keep the latter properly tensioned during the operation thereof. However, to ensure that the member 48 is always properly positioned regardless of the relative locations of the drive and driven members, biasing means are provided for urging the tension member 48 toward the larger of the drive and driven members and against the flexible drive element. Specifically, with reference to FIGS. 1–3, the biasing means comprises a spring guide rod 64 which is slidably mounted in an aperture provided in a tab 66 formed integrally with the side 52 of the member 48 and projecting toward the opposite side 50. A clearance space 67 is thus defined between the tab 66 and the side 50 so that the chain 40 can be passed through the opening 58 without taking the chain apart. Encircling the rod 64 and compressed between a washer-like abutment 68 carried by the rod 64 and the cross piece 66 is a coil compression spring, shown schematically at 70. The upper end of the rod 64, as viewed in FIG. 1, is bent rightwardly and is pivotally mounted on a chain case or housing 72 such that the rod 64 may swing in pendulum fashion about its upper end.

It is here to be noted that a tension spring may be used in lieu of the compression spring 70, however, tension springs normally have hooked ends to effect their mounting and such hooked ends are prone to fatigue. Therefore, a coil compression spring such as the spring 70 is preferred.

The operation of the tensioning device is as follows. Assuming that the snowmobile 10 is accelerating in the forward direction, the run 44 of the chain 40 will become taut and as it does so it will urge the tensioning member 48 rearwardly (as viewed in FIG. 1) so as to cause the slack in the run 42 to be taken up. As the chain 40 stretches or otherwise becomes slacker because of wear of the drive components, the member 48 will shift downwardly to automatically take up the slack.

It is to be understood that while the present invention has been described as used in conjunction with a chain drive, it would be equally as applicable to a belt drive or any other drive where a flexible drive element is used to transmit torque between rotatably driven generally cylindrical members of different diameters.

I claim:

1. In combination with a drive of a type including a support on which generally cylindrical drive and driven members of different diameters are mounted for rotation about parallel axes and a flexible drive element trained over the drive and driven members so as to form first and second runs located at opposite sides of a line of centers passing through said axes, a tensioning device comprising: a tensioning member located between said drive and driven members and including a center portion located between the first and second runs and joining first and second abutment surface means, which are respectively engaged with outer periphery locations of said first and second runs of the flexible drive element; said first and second abutment surface means being spaced apart by a distance no greater than the diameter of the larger of said drive and driven members and biasing means operatively connected to said support and said tensioning member and biasing said tensioning member toward the larger of said drive and driven members and against said flexible drive element.

2. The combination defined in claim 1 wherein said biasing means and said flexible drive element form the sole means supporting said tensioning member.

3. The combination defined in claim 1 wherein said tensioning member has a generally rectangular opening extending therethrough; said first and second abutment surface means respectively forming opposite walls of said opening; and said flexible element extending through said opening.

4. The combination defined in claim 3 wherein said biasing means includes a coil compression spring compressed between a spring mounting means, connected to said support, and said tensioning member.

5. The combination defined in claim 4 wherein said spring mounting means comprises a rod extending centrally between the first and second abutment surface means and slidably received in an apertured portion of said tensioning member; said rod being pivotally mounted on said support for pendulum-like swinging movement about an axis located on said line of centers; and said coil compression spring having one end engaged with an abutment carried by said rod.

6. In combination with a drive of a type including a support on which generally cylindrical drive and driven members of different diameters are mounted for rotation about parallel axes located one above the other with the larger of the drive and driven members being located below the other, and a flexible drive element trained over the drive and driven members so as to form first and second upwardly converging runs, a tensioning device comprising: a tensioning member located between said drive and driven members and including first and second abutment surface means respectively engaged with outer periphery locations of said first and second runs of the flexible drive element; said first and second abutment surface means being spaced apart by a distance no greater than the diameter of the lowermost of said drive and driven members, and said flexible element supporting the entire weight of said tensioning member.

* * * * *